United States Patent [19]
Tackett

[11] 4,216,989
[45] Aug. 12, 1980

[54] POP-UP COVER FOR MOTOR VEHICLE

[76] Inventor: Melvin G. Tackett, 1315 W. 16th St., Tempe, Ariz. 85281

[21] Appl. No.: 949,665

[22] Filed: Oct. 10, 1978

[51] Int. Cl.² .............................................. B60J 7/20
[52] U.S. Cl. .................................. 296/136; 150/52 K
[58] Field of Search ............................ 296/136, 95 C; 150/52 K; 160/21, 22, 30, DIG. 2; 135/5 A, 15 CF

[56] References Cited
U.S. PATENT DOCUMENTS

| | | | |
|---|---|---|---|
| 1,679,887 | 8/1928 | Wright | 296/136 |
| 1,728,006 | 9/1929 | Parry et al. | 160/22 |
| 1,918,423 | 7/1933 | Persinger | 150/52 K |
| 1,999,171 | 4/1935 | Bryant | 150/52 K |
| 2,639,751 | 5/1953 | Flaherty | 150/52 K |
| 2,871,931 | 2/1959 | Hastings | 160/21 |
| 3,050,075 | 8/1962 | Kaplan et al. | 135/5 A |
| 3,401,977 | 9/1968 | Schamel | 296/136 |
| 3,884,523 | 5/1975 | Allen | 150/52 K |

*Primary Examiner*—David M. Mitchell
*Attorney, Agent, or Firm*—William H. Drummond

[57] ABSTRACT

A weather protective cover for a motor vehicle is stored within a protective storage compartment having a pop-up access cover which functions to withdraw part of said weather protective cover from said storage compartment when the cover has been in storage and the access cover is opened. Said access cover acts further to secure said weather protective cover to said storage compartment while said cover is deployed to protect the vehicle and the access cover is closed.

1 Claim, 10 Drawing Figures

POP-UP COVER FOR MOTOR VEHICLE

BACKGROUND OF THE INVENTION

1. Field of the Invention

The invention relates to weather protective covers for motor vehicles and the like.

More particularly, the invention relates to weather protective covers which are stored in a carrier compartment on said vehicle when the cover is not deployed for use.

More specifically, the invention relates to a motor vehicle weather protective cover stored in a carrier compartment which compartment has an access opening which facilitates handling of said weather protective cover by withdrawing a portion of said weather protective cover from said compartment when the access cover of said compartment is opened.

Further, in the invention described immediately above, said access cover provides the means whereby said weather protective cover is secured to said carrier compartment while said weather protective cover is deployed and said access cover is closed.

2. Prior Art

Portable coverings for motor vehicles are well known. Flaherty in U.S. Pat. No. 2,639,751 in 1953 discloses a plastic throw cover which is held in place by small magnets along its edge. The more sophisticated concepts provide for more form-fitting coverings which are stored in containers affixed to the motor vehicle. In 1928, Wright (U.S. Pat. No. 1,679,886) introduced a cover stored on four rollers. Each roller stored a portion of said cover and the operator assembled the full cover after each part was unrolled from its roller. Similar roller-plus-assembly concepts were discussed by Bryant (U.S. Pat. No. 1,999,171) in 1935, by Hastings (U.S. Pat. No. 2,871,931) in 1959, and in 1962 by Kaplin et al (U.S. Pat. No. 3,050,075). In each of these, the cover, as it was stored in sections on individual rollers, had to be properly folded before being placed in its carrier compartment. When the cover was deployed for use in protecting the motor vehicle, the various sections had to be joined together to be usable. Such troublesome procedures would actually discourage the frequent use of the weather protective cover.

SUMMARY OF THE INVENTION

Because of the disadvantages of prior art weather covers for motor vehicles, the present invention has as its object the provision of a weather protective cover for motor vehicles, use of which cover will avoid the disadvantages of the prior art and provide a convenient, simple and inexpensive means for protecting a motor vehicle.

It is a further object of the invention to provide a self-contained weather protective cover for a motor vehicle which cover may be shaped to conform to the contours of the vehicle.

It is a specific object of the invention that no assembly of cover parts be required when the cover is deployed to protect the vehicle.

It is another object of the invention that the carrier in which the weather protective cover is stored and transported shall provide means for presenting a portion of said cover to the operator when said carrier is opened, thus providing ease of access to and handling of the weather protective cover.

A further specific object of the invention is that the carrier in which the weather protective cover is stored and transported shall provide means for securing said cover to said carrier when said cover is deployed to protect the motor vehicle and access to said carrier is closed.

In summary, therefore, the invention comprises a weather protective cover for a motor vehicle. Said cover may be fabricated so as to conform to the shape of all or a selected portion of said motor vehicle. Said cover is stored and transported in a protective carrier mounted at a convenient location on said vehicle. When said carrier is opened, ejection means provided cause a portion of the weather protective cover to be brought forth for ease of access and handling. When the cover is deployed so as to protect the vehicle, security means integral with said carrier secure said cover to said carrier when said carrier is closed, thereby discouraging theft of said cover when it is in use.

BRIEF DESCRIPTION OF THE DRAWINGS

FIGS. 4A–4D illustrate the steps to be followed in deploying and securing the protective cover;

DESCRIPTION OF THE INVENTION

Figure 1:
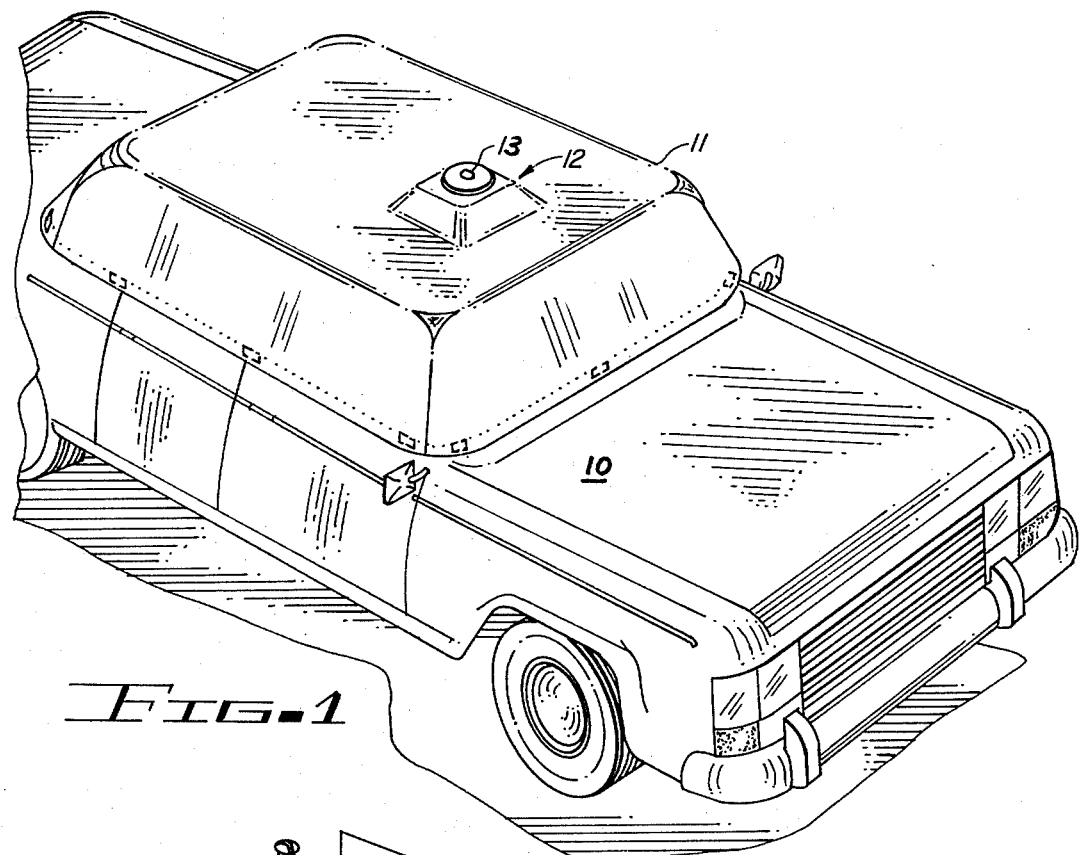
FIG. 1 illustrates a motor vehicle on which the invention is in use, the weather protective cover being deployed and the carrier access cover securing the weather cover to said carrier.

The automobile 10 of FIG. 1 is shown with a weather protective cover 11 deployed over the roof and windows of the car. In showing a cover which protects only a part of the car illustrated implies no limitation on the size of the protective cover used with the invention or on the extent to which it may protect the motor vehicle's surfaces. Full or partial car coverage may be provided while remaining within the claimed scope of the invention.

A carrier 12 is shown in phantom outline. Carrier 12 is shown mounted to the roof of automobile 10. The shape of carrier 12 disclosed herein is suggestive only and not meant to limit the styling, size or configuration which said carrier 12 may assume. The carrier may be smoothly molded into one of the vehicle's surfaces, such as its roof, hood or trunk cover, and supplied as original equipment on a new vehicle or as an essentially flush fitting, low profile modification to an existing motor vehicle.

The access cover 13 of carrier 12 extends above the surface of protective cover 11 and when closed while protective cover 11 is deployed, as illustrated in FIG. 1, compresses said protective cover between the upper surface of carrier 12 and the lower surface of access cover 13, thereby securing the protective cover in place so as to discourage its theft.

In the illustrations, like reference numbers refer to like elements.

Figure 2:
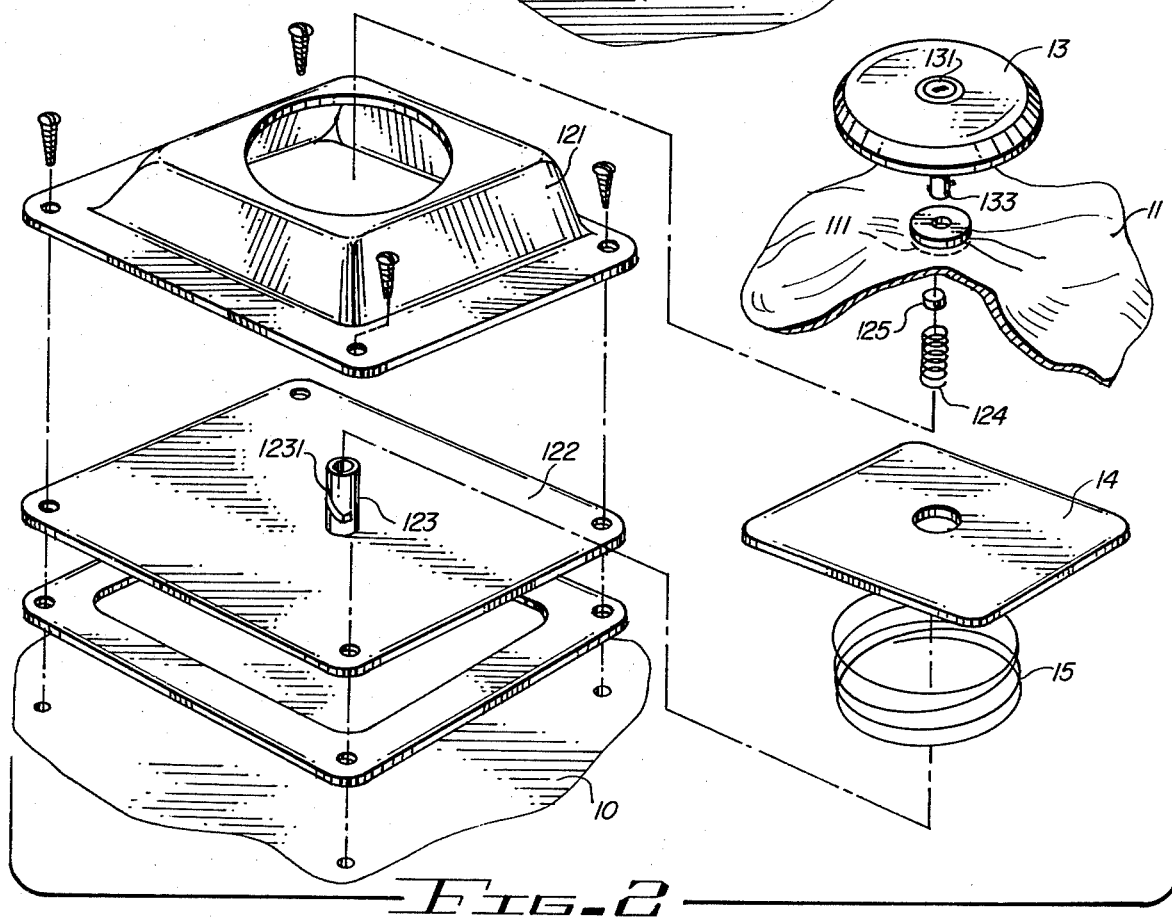
FIG. 2 shows a suggested mounting arrangement for affixing the carrier to a motor vehicle and includes an exploded view of the carrier's component parts including the pop-up access cover and means for attaching the weather protective cover thereto.
Figure 3:
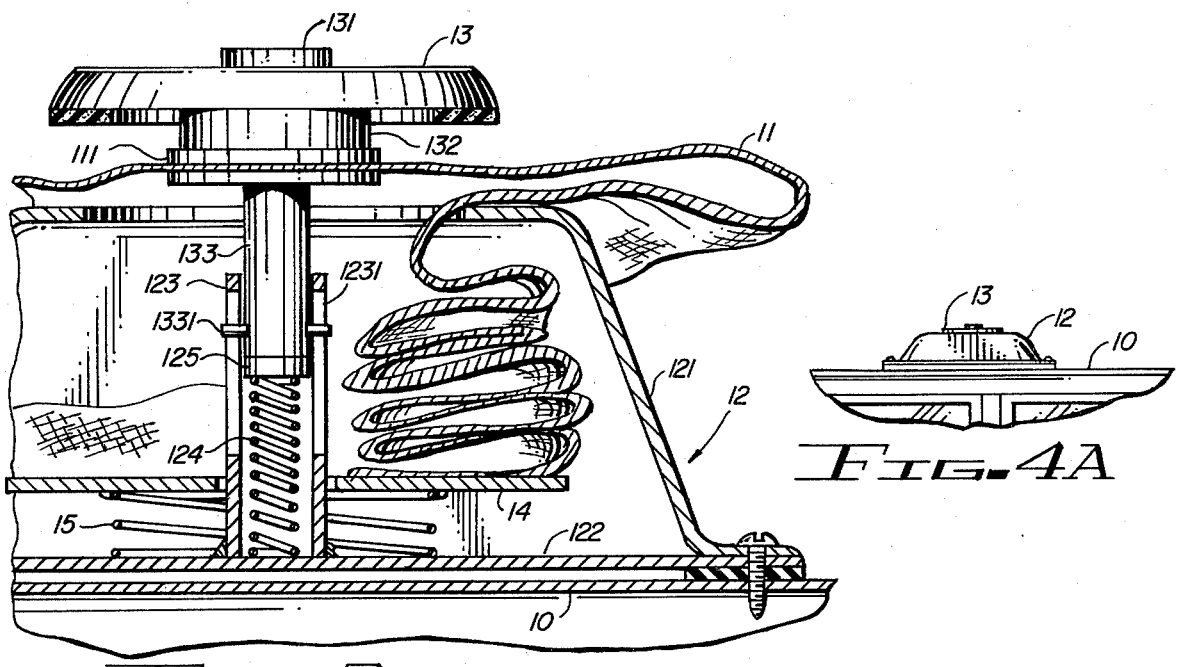
FIG. 3 is a sectional view of the carrier helpful in understanding the pop-up function of the access cover in ejecting a portion of the weather protective cover and of the manner in which the closed access cover secures the weather protective cover to the carrier when the protective cover is deployed and the access cover closed.

FIG. 2 is an exploded view of the elements comprising carrier 12 and includes access cover 13 and a segment of protective cover 11. A sectional view of the same elements, as assembled, is illustrated in FIG. 3.

Carrier 12 is comprised of housing 121 and bottom plate 122. A lockpin cylinder 123 is affixed to bottom plate 122. Access cover 13 is equipped with a key cylinder 131 and lock mechanism 132, as well as a shaft 133 extending below said access cover. Shaft 133 is fitted with locking pins 1331 which are slidably accepted by lockpin channels 1231 of lockpin cylinder 123 when shaft 133 is inserted into said cylinder.

Also incorporated within cylinder 123 is compression spring 124 and spring retaining ring 125. Retaining ring 125 moves slidably within lockpin cylinder 123 as spring 124 is compressed and expanded by the excursions of shaft 133.

When these elements are assembled, as shown in FIG. 2, a compressive force on top of access cover 13 will drive shaft 133 down into cylinder 123 compressing spring 124 and bringing access cover 13 to bear down on carrier housing 121. Lock mechanism 132, lockpin cylinder 123 and shaft 133, in cooperation, hold access cover 13 in this position which will henceforth be referred to as the "closed position" of said access cover.

When the proper key is inserted into key cylinder 131 and operated, access cover 13 is released, permitting spring 124 to expand and cause said access cover to "pop up" to what will henceforth be referred to as its "open position".

Weather protective cover 11 is stored and transported within carrier 12. When deployed to protect car 10, cover 11 also encloses carrier 12. Shaft 133 of access cover 13 passes through protective cover 11 an maintains protective cover 11 in position relative to carrier 12. Protective cover 11 is affixed to shaft 133 using any suitable fastening means and reinforcing rings 111.

As a study of FIG. 3 will reveal, placing access cover 13 in its closed position while protective cover 11 is deployed will engage said protective cover between the lower surface of access cover 13 and the upper surface of carrier housing 121. The fact that weather protective cover 11 is retained by both the passage of shaft 133 through it and by the pressure of closed access cover 13 discourages theft of the weather protective cover while it is deployed over the motor vehicle's surface.

Weather protective cover 11 may be made from cloth, plastic or other flexible, crushable material for ease of stowage in carrier 12. Protective cover 11 is placed in carrier 12 while access cover 13 is in its open position. With access cover 13 closed and locked, it and carrier 12 provide a weather protective, reasonably theft-proof, and convenient means for storing, transporting and utilizing weather protective cover 11.

The means for locking access cover 13 in its closed position may be a key lock mechanism, as shown here, or electromechanical or other means suitable for the purpose.

In use, access cover 13 is unlocked which allows spring 124 to raise access cover 13 up to its open position. Because protective cover 11 is attached to access cover 13 by means of shaft 133 and reinforcing rings 111, the opening of access cover 13 automatically brings forth a portion of protective cover 11, making it conveniently accessible for ease of handling. Shaft 133 is long enough to provide sufficient access to carrier 12 so that protective cover 11 may be easily stored or removed with access cover 13 in its "pop-up" open position.

For greater convenience in removing protective cover 11 from carrier 12, shaft 133 and lockpin cylinder 123 may be simply and easily disengaged so that access cover 13 may be lifted up, free of carrier 12, which action will draw forth a significant amount of the material of which protective cover 11 is comprised and will provide full unimpeded access to the balance of said material remaining within carrier 12.

As an added means to assist the removal of protective cover 11 from carrier 12, a spring-loaded, floating platform may be provided to raise the material of protective cover 11 up toward the access opening of carrier 12 as the protective cover is removed therefrom. Platform 14 and spring 15 are illustrated in the drawings and their function there is self-evident. The provision of platform 14 and spring 15 is not essential to the practice of my invention.

Figure 4C:
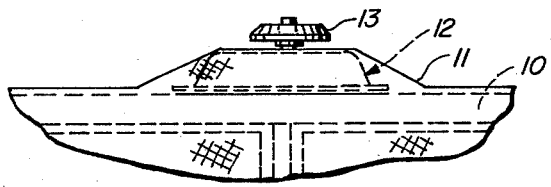
Figure 4B:
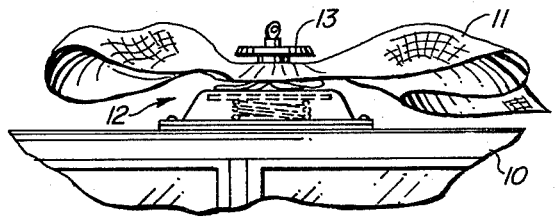

FIGS. 4A–4D illustrate the use of my invention. In FIG. 4A, carrier 12 is mounted to a convenient surface of motor vehicle 10. Access cover 13 is in its closed position and locked. In FIG. 4B, access cover 13 has been unlocked and allowed to assume its open position, which action drew forth and made accessible some of the material of protective cover 11. Most of protective cover 11 is illustrated as having been removed from carrier 12.

Figure 6:
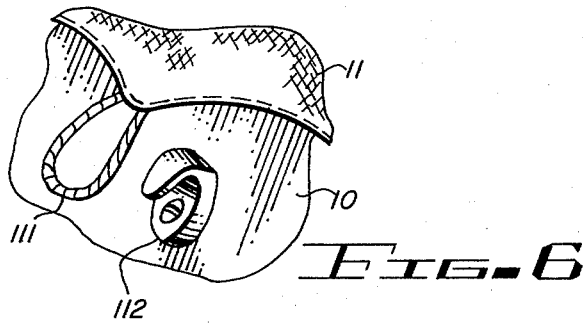
FIGS. 6 and 7 suggest means by which the edges of the protective cover may be maintained in contact with the body of the motor vehicle.
Figure 7:
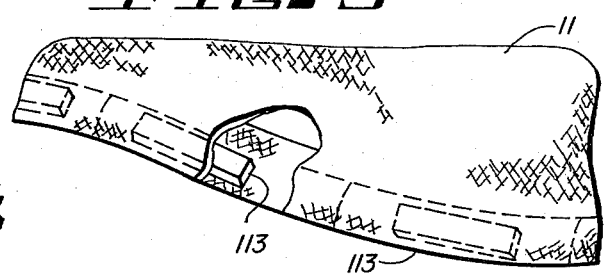

Protective cover 11 is deployed over the surfaces of the motor vehicle and the edges of said cover are held in contact with the body of the vehicle using suitable means such as the examples illustrated in FIGS. 6 and 7 which use loops 111 and hooks 112 or which incorporate small magnets 113 along the edges of the protective covering.

Figure 4D:
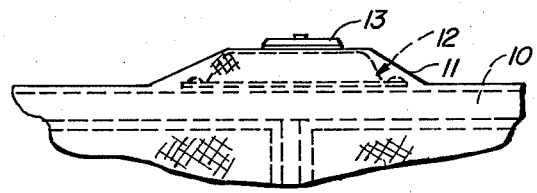

With protective cover 11 deployed over the vehicle's surfaces that are to be protected, FIG. 4C, access cover 13 is placed in its closed-and-locked position, FIG. 4D.

The reverse procedure is followed to stow the protective covering material which, being flexible and crushable, requires no set procedure for folding and placing protective cover 11 within carrier 12.

Figure 5:
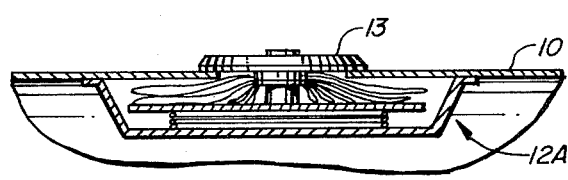
FIG. 5 is an alternate carrier embodiment.

Means for providing a convenient, inexpensive, weather protective covering for a motor vehicle have been disclosed. Those skilled in the art will recognize that modifications may be made in the embodiment of the invention herein disclosed which modifications will not depart from the sprit and thrust of the teachings herein. For example, other means for raising up access cover 13 may easily be conceived of which do not require the use of spring 124. Further, carrier 12 has been illustrated as an add-on feature for a motor vehicle and is shown fastened to and rising above the surface of the vehicle. FIG. 5 suggests an alternate embodiment 12A of carrier 12 wherein the carrier housing is below a surface of the vehicle. An installation of the type suggested by FIG. 5 preserves the vehicle's body lines and could be provided as original equipment or added on to an existing vehicle by mounting carrier 12A beneath the hood, trunk, or roof surfaces.

Having described my invention in such a clear and thorough manner as to enable those skilled in the art to practice its teachings, I claim:

1. A protective covering system for a vehicle, comprising:

(a) a compartment defined on said vehicle,
(b) a flexible sheet member, said sheet member being readily collapsible and adapted to be folded into said compartment for storage therein between use, and
(c) cover means movably connected to said compartment for providing access to the interior thereof and having at least two operative positions,
   (i) an open operative position with said cover means displaced from and providing access to said compartment such that said sheet member may be removed from said compartment and deployed over said vehicle, and
   (ii) a closed operative position with said cover means resting on and securing a portion of said flexible sheet member against said compartment, a segment of said sheet member being attached to said cover means, said segment being situated inwardly of said compartment when said cover means is in said closed operative position.

* * * * *